United States Patent Office 3,213,705
Patented Oct. 26, 1965

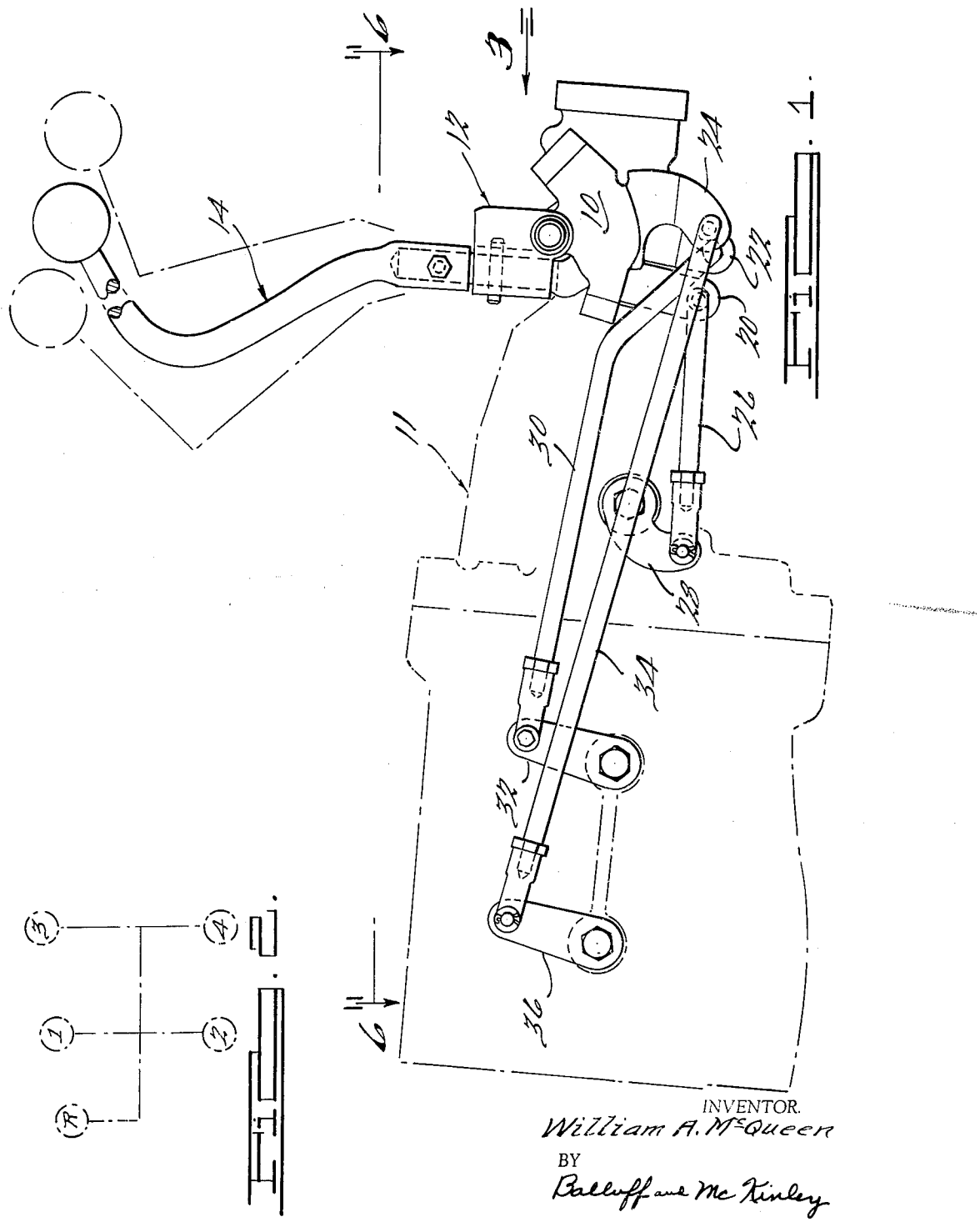

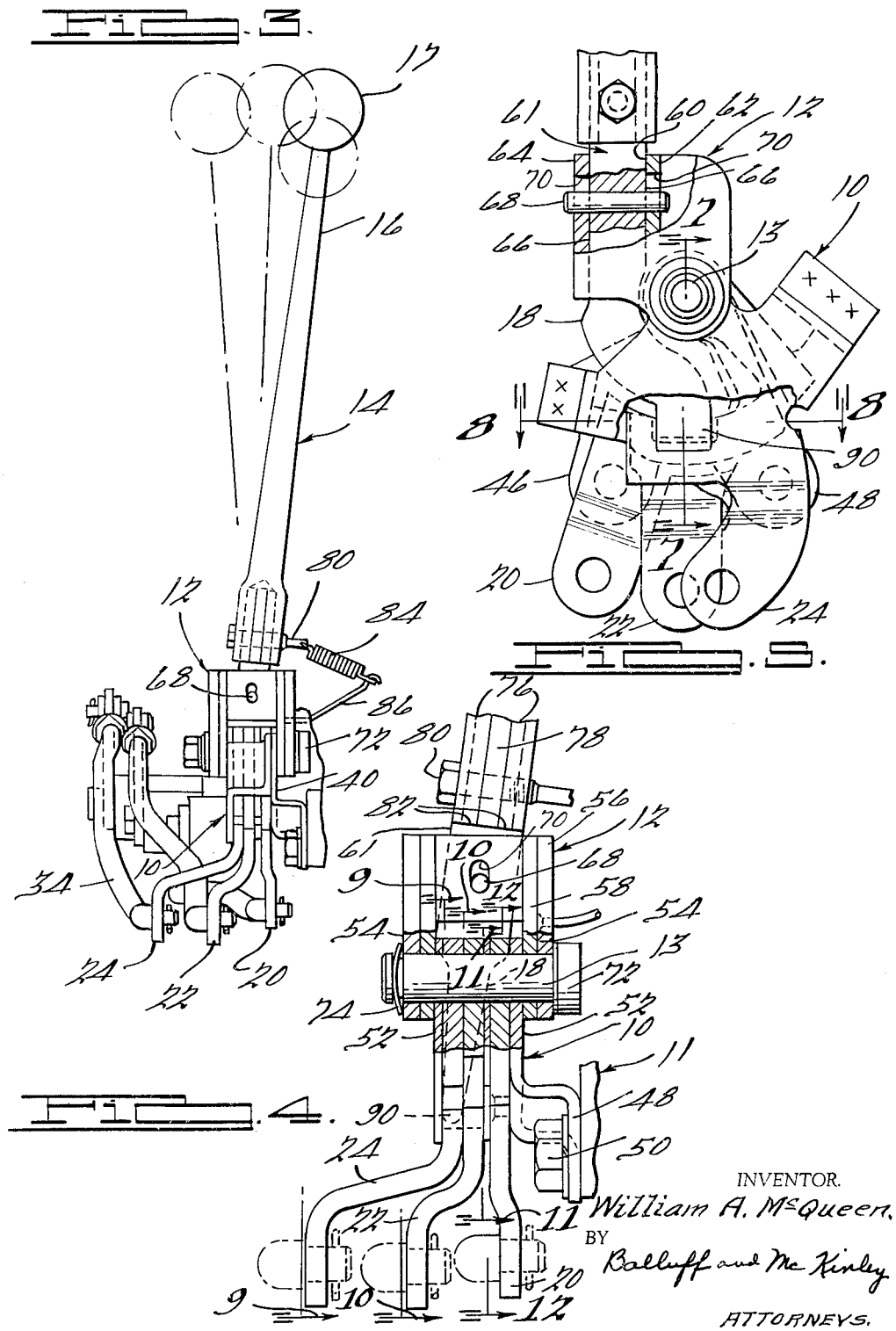

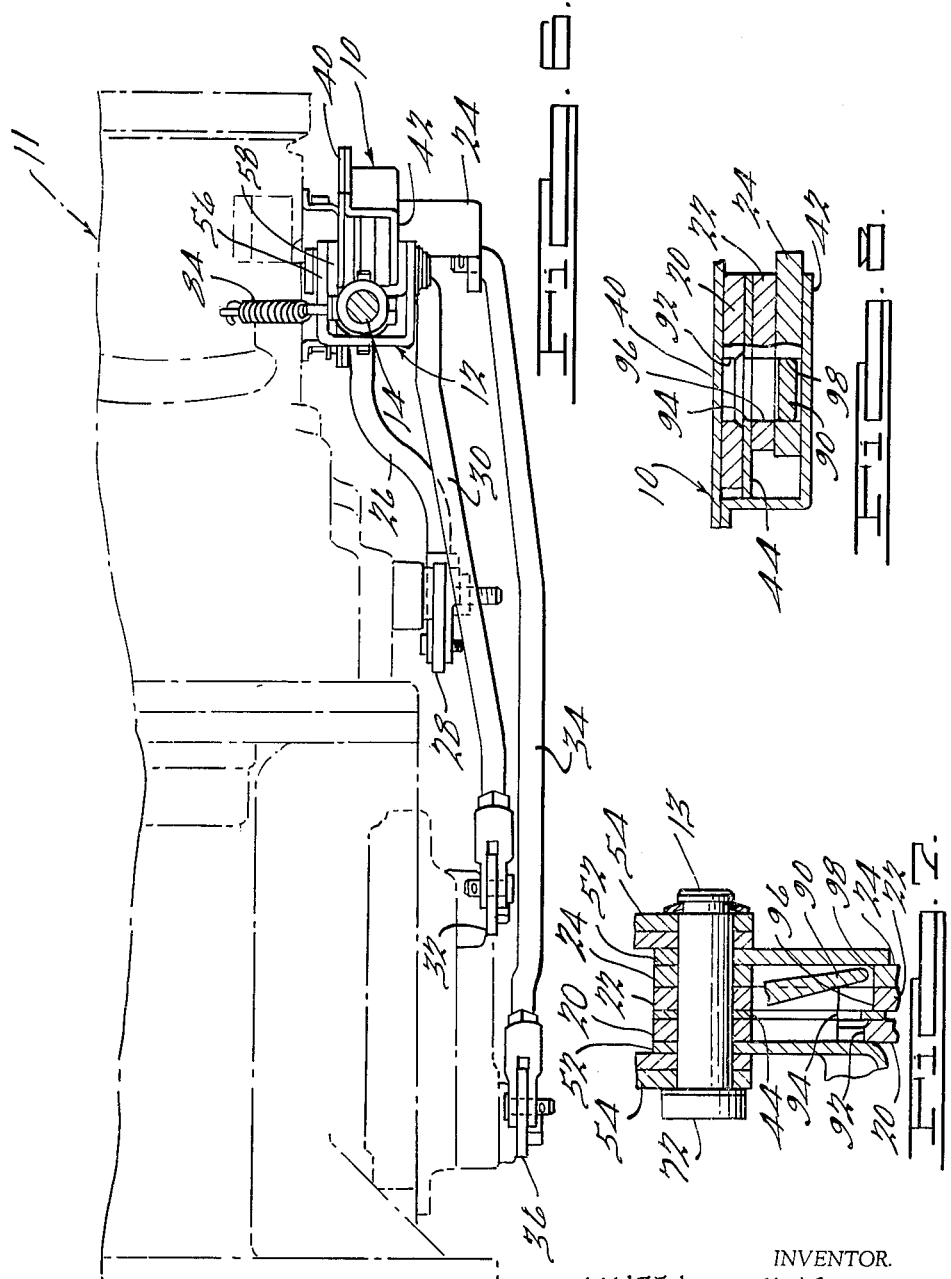

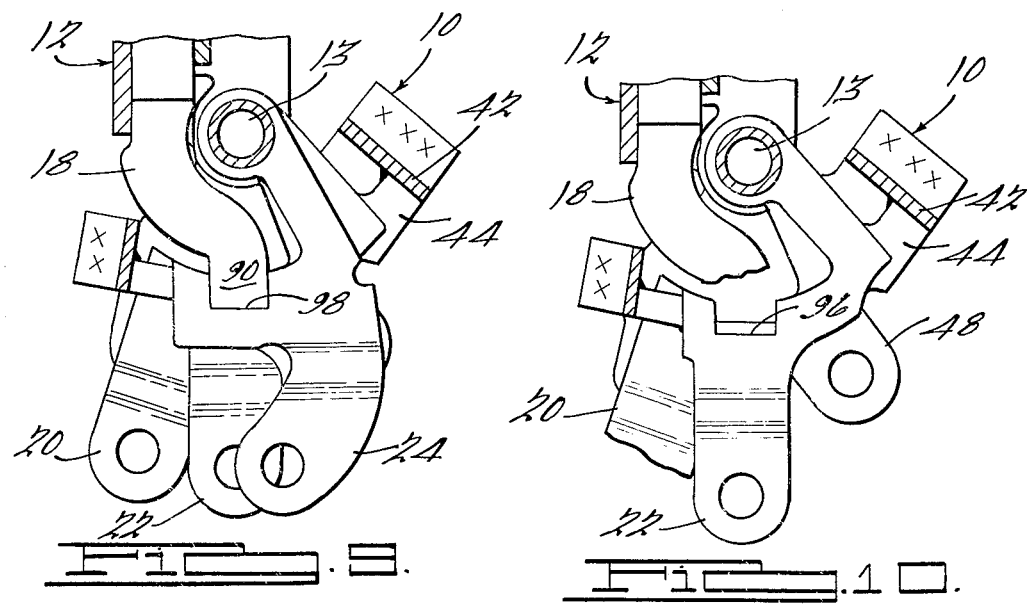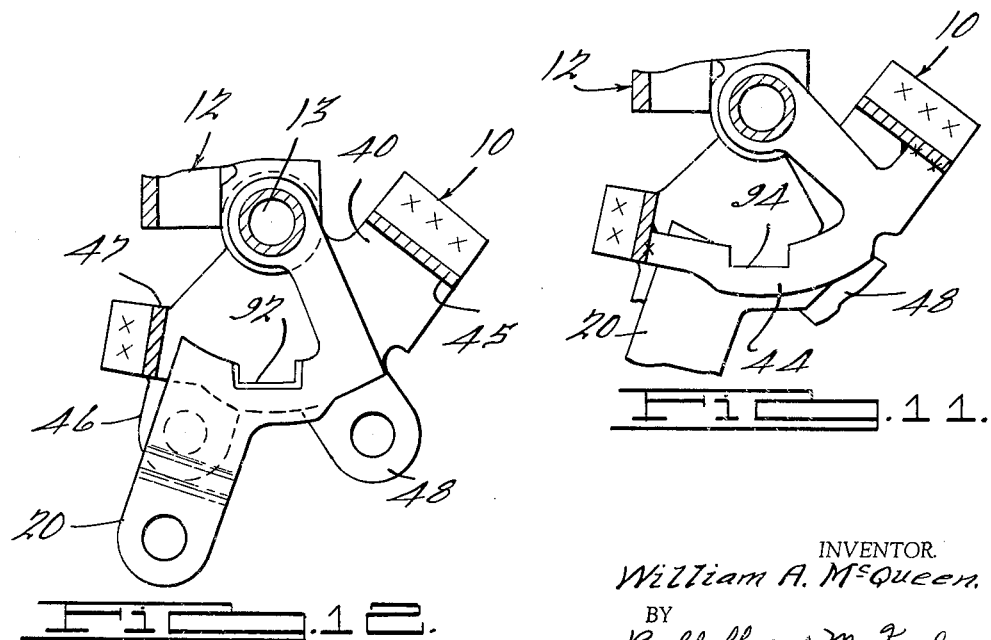

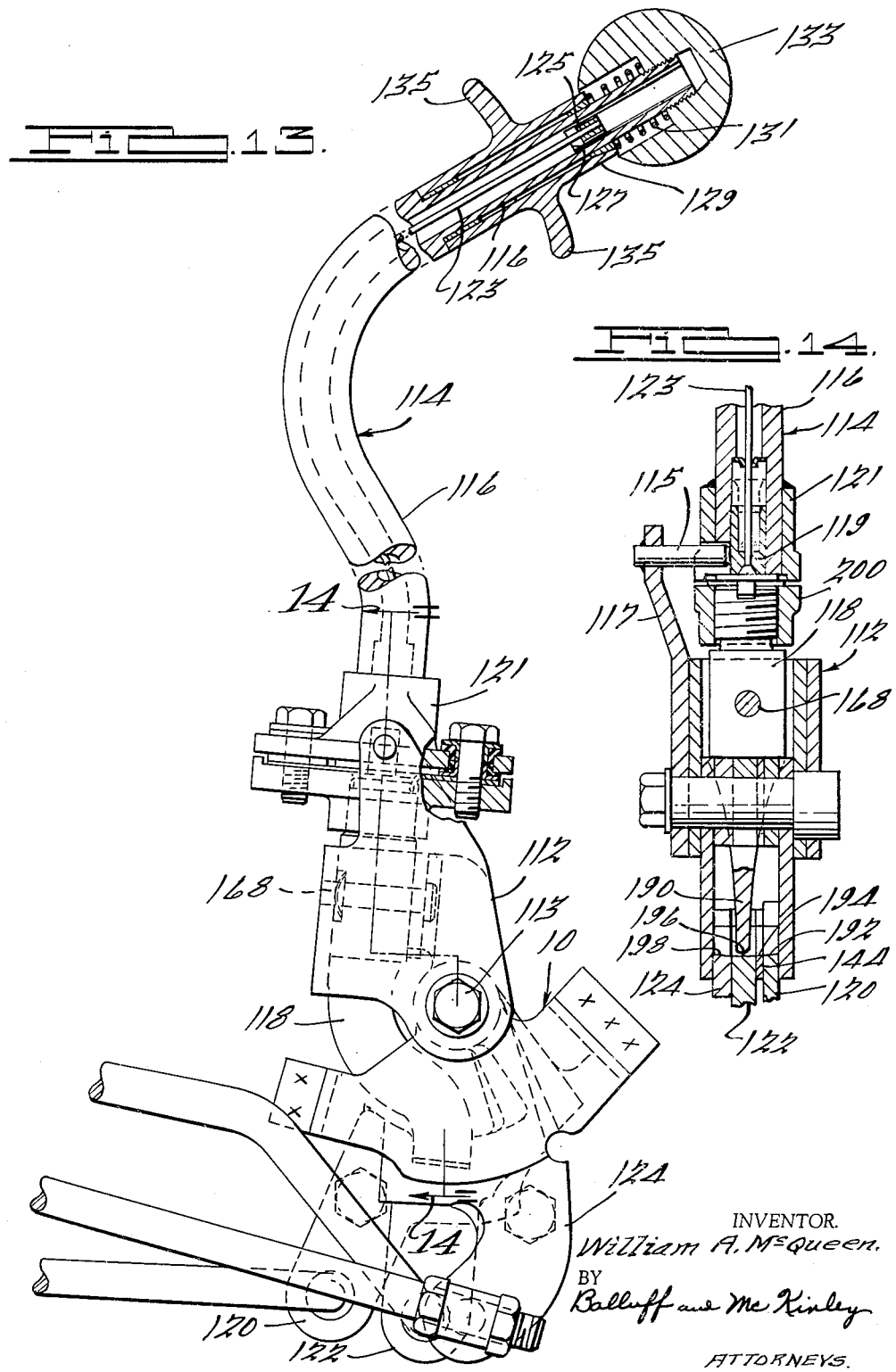

3,213,705
POWER TRANSMISSION CONTROL
William A. McQueen, Bloomfield Hills, Mich., assignor to Inland Tool & Manufacturing, Inc., Detroit, Mich., a corporation of Michigan
Filed Apr. 30, 1963, Ser. No. 276,898
5 Claims. (Cl. 74—476)

This invention relates to power transmission controls and has particular reference to a gear shift selector assembly for a power transmission for motor vehicles whereby the operator may, by manipulating a hand-operated lever, positively select one of the driving "gears" or "speeds" of the transmission.

Present hand-operated gear shifts of this type leave a great deal to be desired from the standpoint of cost, dependability, and ease of operation.

A principal object of the present invention is to provide a simplified gear shift assembly which is rugged in construction, dependable and easy to use, and relatively inexpensive to manufacture.

Another object of the invention is to provide a basic construction for a gear shift selector assembly which lends itself to modification whereby a series of models may be readily obtained without duplication of tooling.

Other and further objects of the invention will be apparent from the folowing description and claims and may be understood by reference to the accompanying drawings, of which there are five sheets, which by way of illustration show preferred embodiments of the invention and what I now consider to be the best mode of applying the principles thereof. Other embodiments of the invention may be used without departing from the scope of the present invention as set forth in the appended claims.

In the drawings:

FIG. 1 is a side elevational view of a power transmission and control therefor embodying the invention;

FIG. 2 is a shift diagram;

FIG. 3 is a rear elevational view of the control, looking in the direction of the arrow 3 in FIG. 1;

FIG. 4 is an enlarged fragmentary rear elevational view of the control with parts broken away;

FIG. 5 is a side elevational view of the control shown in FIG. 4;

FIG. 6 is a plan view taken generally along the line 6—6 of FIG. 1;

FIG. 7 is a vertical sectional view taken along the line 7—7 of FIG. 5;

FIG. 8 is a horizonal sectional view taken along the line 8—8 of FIG. 5;

FIG. 9, 10, 11 and 12 are sectional views taken along the lines 9—9, 10—10, 11—11, and 12—12 respectively of FIG. 4;

FIG. 13 is a side elevational view of a modified form of the invention; and

FIG. 14 is a sectional view taken along the line 14—14 of FIG. 13.

The control in general comprises a fixed guide bracket 10 secured to the side of the transmission 11, a movable guide bracket or yoke 12 which is pivotally mounted on the bracket 10 by means of the pivot pin or shaft 13, and an upright shift lever indicated generally at 14, the upper end 16 of which is provided with a knob 17. The lower end of the shift lever 14 forms a selector arm or member 18 which is selectively cooperable with the levers or shifter elements 20, 22 and 24 whereby the operator may select the appropriate one of the various drives provided by the transmission 11. The lever 20 forms a reverse shifter element, the lever 22 the low or first and second speed shifter element, and the lever 24 the high or third and fourth speed shifter element. The levers or elements 20, 22 and 24 are pivotally mounted on the pin or shaft 13 and are confined in side by side relation by the guide bracket 10. A link 26 interconnects the lever 20 with a shifter lever 28 pivotally mounted on the outside of the transmisison case. A link 30 interconnects the lever 22 and a shifter lever 32 pivotally mounted on the outside of the transmission case, and a link 34 interconnects the high speed lever 24 and a shifter lever 36 pivotally mounted on the outside of the transmission case. The transmission and control are shown in neutral in FIG. 1, 3, 4, 5 and 6.

The fixed guide bracket 10 includes spaced plates 40 and 42 which confine the levers 20, 22 and 24 as shown in FIGS. 7 and 8 with a fixed interlock plate 44 disposed between the levers 20 and 22. The plate 40 is provided with a pair of mounting lugs 46 and 48 welded thereto whereby the control assembly may be fixedly and rigidly secured by means of bolts, such as 50, to the outside of the housing of the transmission 11. The plates 40 and 42 are provided with ears 52 having aligned holes in which the pivot pin 13 is located with the axis of the pin 13 normal to the plane of the arcuate slot defined by the spaced plates 40 and 42. The ends of the pin 13 project laterally beyond the ears 52 and form trunnions on which the yoke 12 is pivoted, the yoke being provided with spaced ears 54 which straddle the ears 52, and the ears 54 being provided with aligned holes for receiving the ends of the pin 13 whereby the yoke or movable guide bracket 12 is pivotally mounted on the bracket 10.

The yoke 12 comprises two nested U-shaped metal strips 56 and 58 having the legs thereof welded or otherwise suitably secured together and formed so as to define a vertical slot 60 through which the lower end of the shift lever extends, the slot 60 being formed by spaced parallel wall portions 62 and 64 (FIG. 5) of the members 56 and 58. That portion 61 of the shift lever member 18 which is disposed within the slot 60 is square in cross section and provided with flat sides 66 for cooperation with the opposed flat surfaces of the wall portions 62 and 64 so as to prevent turning of the lever 14 about its vertical axis. As shown in FIG. 4, the transverse dimension of the slot 60 is greater than the width of the section 61 of the shift lever member 18. Such section 61 carries a cross pin 68, the ends of which project through aligned vertical slots 70 in the wall portions 62 and 64 of the yoke 12 whereby the lever 14 is free to move vertically a limited distance within the slot 60 as determined by the travel permitted the cross pin 68 in the slot 70. The cross pin 68 and slot 70 also provide a pivot whereby the lever 14 may rock in a transverse plane within the limits within the slot 60. It will be evident, particularly from FIGS. 3, 4 and 5, that the vertical length of the slot 60 and the vertical extent of the portion 61 disposed therein are substantial.

The portions 62 and 64 which define the front and rear walls of the slot are spaced so as to provide a sliding fit for the flat sides of the section 61 of the part 18. It will be evident from FIGS. 3, 4 and 5 that the shift lever 14 is free to rock in a transverse plane about the axis of the pin 68. However, in a plane normal to the axis of the pivot pin 13 the close sliding fit between the slot 60 in the yoke 12 and the section 61 of the shift lever part 18 permits no relative movement between the shift lever 14 and the yoke 12 so that movement of the shift lever 14 in such plane will shift or pivot the yoke 12 about the axis of the pin 13. Because of this, the reaction of the force applied to the shift lever 14 in shifting the same from neutral into one of the selected drives or back to neutral will be applied through the ears 54 of the yoke 12 to the pivot pin 13. The pivot pin 13 as a consequence is substantially made. It includes a head 72 at one end, and at its other end is provided with a spring washer 74 so as to maintain the pin 13 in its assembled position as shown in FIG. 4.

The part 18 forming the lower end of the shift lever is formed as a piece separate from the handle 16, the lower end of the latter being bifurcated as indicated at 76 for receiving a tongue 78 of the part 18. A threaded bolt 80 fixedly secures the tongue 78 in the bifurcated end 76 of the handle 16, the lower end faces of the bifurcation seating on shoulder 82 provided by the square section 61 of the lower part 18 so that the handle 16 is integral with the part 18. A coil spring 84 hooked to the end of the bolt 80 and to a hook 86 carried by the yoke 12 serves to bias the shift lever 14 in a clockwise direction.

The lower part 18 of the shift lever 14 is curved and extends in an arc below the pivot pin 13 and then downwardly directly below the pivot pin 13 to form a pawl 90. As more clearly shown in FIGS. 7 and 8, the levers 20, 22 and 24 and the interlock plate 44 are provided with notches or slots 92, 94, 96 and 98, into one of which the pawl 90 extends. The notches form shoulders or abutments upon which pawl 90 reacts. For example, in FIGS. 7 and 8 the pawl 90 is positioned in the notch 98 in the lever 24 which is the high or third and fourth speed lever. This arrangement of the pawl 90 in the notch 98 in effect integrates the shift lever 14 with the lever 24 so that movement of the shift lever 14 in a plane normal to the axis of the pin 13 and about such axis will shift or reciprocate the lever 24 so as to selectively shift the transmission from neutral into either third or fourth speed drive, depending upon the direction of movement of the handle 16. It will be understood that the slots 92, 94, 96 and 98 are aligned as shown in FIGS. 7 and 8 only when the transmission and control are in neutral so that after shifting the lever 24 from neutral into third or fourth speed drive, as the case may be, it will be necessary to return the shift lever 14 to neutral position before the pawl 90 can be shifted into operative engagement with either of the slots in the levers 20 or 22.

It will be evident that by rocking the shift lever 14 about the axis of the pin 68, the pawl may be positioned in the slot 96 in the low or first and second speed lever 22 for shifting the same from neutral into either first or second speed and back to neutral when the shift lever 14 is shifted so as to pivot about the axis of the pin 13.

It will be noted in FIG. 7 that the slots 94 and 92 in the interlock plate 44 and in the lever 20 are not as deep as the slots 96 and 98. This forms, in effect, a gate between the slot 96 and the slot 92 which prevents the operator from accidentally shifting into reverse and which serves to locate the pawl 90 in the slot 96 when the operator wants to shift the transmission into either first or second speed. It will be recalled that the pin and slot arrangement 68, 70 between the shift lever 14 and the yoke 12 provides for limited vertical movement of the lever 14 relative to the yoke 12. This makes it possible for the operator by a slight lift of the shift lever 14 to move the latter upwardly relative to the yoke 12 so as to enable the pawl 90 to pass through the slot 94 in the interlock plate 44 and into the slot 92 in the lever 20, whereby the operator, by moving the shift lever in a plane normal to the axis of the pin 13 and about such axis, can shift the transmission from neutral into reverse and vice versa.

It will be understood that the interlock plate 44 is fixed relative to the bracket 10 as shown in FIG. 11, whereas the levers 20, 22 and 24 are all shiftable about the pin 13. The plate 42 is U-shaped so that the spaced ends 45 and 47 thereof serve to limit the pivoting movement of the levers 20, 22 and 24.

The transmission 11 is a four-speed and reverse transmission which may be set so as to selectively provide four forward speed drives of different gear ratios and a reverse gear drive. Such a transmission is a conventional transmission and may be of the type referred to in U.S. Letters Patent No. 2,922,315. Thus the shifter lever 28 upon being shifted counterclockwise from the position illustrated in FIG. 1 will shift the transmission so as to provide a reverse speed drive. The shifter lever 32 upon being shifted in a clockwise direction from the position illustrated will provide a low speed drive, and upon being shifted in a counterclockwise direction from the position indicated will provide a second speed drive. The shifter lever 36 upon being shifted in a clockwise direction from the position shown will provide a third speed drive, and upon being shifted in a counterclockwise direction from the position shown will provide a fourth speed drive. Levers 28, 32 and 36 are mounted upon shafts which "shift" the transmission from neutral to a selected speed. Detents (not shown) are associated with the shiftable parts of the transmission or with the levers 20, 22 and 24 to maintain such levers and the transmission in the selected drive or in neutral.

In the modification shown in FIGS. 13 and 14 the shift control for the transmission functions similarly to that of the modification just described, but the construction is slightly different in some respects. The modified form of shifter as illustrated in FIGS. 13 and 14 includes a fixed guide bracket 10, levers 120, 122 and 124 similar to and corresponding with the levers 20, 22 and 24, and a yoke or movable guide bracket 112 similar to the guide bracket or yoke 12. The guide bracket or yoke 112, like the bracket 12, is pivoted by a pin 113 to the fixed guide bracket 10. The lower part 118 of the shifter lever 114 is similar to the lower part 18 of the shift lever 14 and pivoted for transverse rocking movement by means of a pin 168 which is pivotally supported by the yoke 112. In the case of FIGS. 13 and 14, however, there is not relative vertical movement possible between the shift lever 114 and the yoke 112, as in the previous modification. In addition, in the embodiment of FIGS. 13 and 14 the slot 192 in the lever 120 and the slot 194 in the interlock plate 144 are the same depth as the slots 196 and 198 in the levers 122 and 124 so that the selector pawl 190 at the lower end of the shift lever is freely movable as shown in FIG. 14 from one of the slots just mentioned to the other when the transmission is in neutral, except as hereinafter described.

To provide the "gate" effect described earlier so as to make it possible for the operator to definitely feel his way for shifting into first or second to prevent accidental shifting into reverse, the transverse rocking of the shift lever 114 is prevented by a pin 115 carried by a bracket 117 on the yoke 112. Thus as shown in FIG. 14, the shift lever 114 may be freely rocked transversely about pin 168 so as to locate the pawl 190 in the slot in the levers 122 and 124 for selecting first, second, third, or fourth speed drive. However, the end of the pin 115 by engagement with the shiftable stop 119 carried by the shift lever 114 prevents the shift lever from being rocked transversely so as to locate the pawl 190 in the slot 192. The pin 115 extends through a hole in the side of the fitting 121 which carries the handle 116 of the shift lever 114. The stop 119 comprises a plug which is slidable within the lower end of the tube which forms the handle 116. A cable 123 extends upwardly through the handle 116 and is connected to a cross piece 125 which extends through opposite slots 127 in the reduced upper end of the handle 116. The cross piece 125 is fixed to a sleeve 129 which is slidable on the outside of the reduced upper portion of the handle 116. A spring 131 reacts against the sleeve 129 and a knob 133 fixed to the upper end of the handle 116. The sleeve 129 is provided with outwardly extending finger grips 135 whereby an operator by placing the palm of his hand on the ball 133 can engage two of his fingers with the grips 135 and move the same and sleeve 129 toward the ball 133 and thereby shift the stop 119 out of the way of the pin 115, thereby permitting the shift lever 114 to be rocked counterclockwise so as to engage the pawl 190 with the notch 192 in the lever 120 so as to enable the operator to shift into reverse. The spring 131 serves to bias the cable 123 and the stop 119 into the path of the pin 115.

As in the previous modification, the handle of the shift lever 114 is separable from the lower part thereof. In the case of FIGS. 13 and 14, the lower part 118 carries a coupling member 200 which is bolted to the cooperating pin or coupling member 121 which carries the handle 116. Thus the shifter of FIGS. 13 and 14 is operated similarly to that of FIGS. 1–12 except that in the former case the reverse "gate" must be released by the simple finger manipulation just described.

The gear shift assembly may be readily adapted for use with a conventional three-speed forward and one speed reverse power transmission by omitting the lever 20 and the interlock plate 44 and by using an arcuate plate to fill the space occupied by the lever 20 and the interlock plate 44. The assembly may also be adapted for use with a transmission having more than four speeds forward and one speed reverse by adding shifter elements similar to the levers 20, 22 and 24 to provide for the additional speeds. It will be further understood that the designation of the levers 20, 22 and 24 as reverse, low speed, and high speed shifter elements is for identification purposes and that the selector assembly may be readily adapted for use with gear shift patterns other than that illustrated in FIG. 2.

In both modifications even though the shift lever is offset from its pivot pin or shaft, the latter provides a fulcrum for the lever when force is applied to the shift lever for shifting gears. This type of construction disclosed makes it possible to provide a shift lever of considerable strength while utilizing a simple and relatively inexpensive pivotal mounting therefor inasmuch as the shift lever is formed of parts other than those which form a part of the pivotal connection for the shift lever. This type of construction also makes possible a very compact assembly without any sacrifice in the rugged construction which is required for devices of this kind.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A control for a power transmission comprising a guide bracket adapted to be secured to said transmission and having wall portions defining an arcuate slot therein, a pivot shaft carried by said bracket and extending transversely across said slot, a series of shifter elements pivoted on said shaft and extending downwardly through said slot, a yoke pivoted on said shaft and disposed on the side thereof opposite said shifter elements, said yoke having an upwardly opening socket therein, a shift lever having one end extending downwardly through said socket and said slot and confined by the walls defining said socket for limited rocking movement about an axis transverse to the axis of said shaft, each of said shifter elements being provided with an upwardly facing notch which is disposed so that when said transmission is in its neutral position said notches are aligned transversely of said slot whereby said one end of said shift lever may be selectively positioned by said rocking movement in one of said notches to effect pivoting of the selected shifter element when said shift lever and yoke are pivoted on said shaft, the oppositely disposed end walls defining the ends of said slot in said guide bracket being engageable by said shifter elements upon pivoting thereof in either direction to limit the pivotal movement of said shifter elements.

2. A control according to claim 1 including at least three shifter elements, one of which is operable to provide for reverse drive, and manually releasable means associated with said shift lever for preventing engagement of said shift lever with said reverse drive shifter element.

3. A control according to claim 2 including a fixed reverse gear interlock plate between said one shifter element and the adjacent shifter element, said interlock plate providing a gate through which said shift lever may be moved to engage said one shifter element upon actuation of said manually releasable means.

4. A control according to claim 3 wherein the walls of said bracket defining the sides of said slot are slidably engaged by the two outer shifter elements, one of which is said reverse drive shifter element, and the intermediate shifter element slidably engages said interlock plate and the other of said two shifter elements.

5. A control according to claim 4 wherein a pin and slot connection provides a pivot between said shift lever and yoke to permit said rocking movement, and that portion of said shift lever in said socket is formed so as to cooperate with the walls of said socket to prevent turning of said shift lever about its axis and to effect pivoting of said yoke and shift lever on said shaft independent of said pin and slot connection.

References Cited by the Examiner

UNITED STATES PATENTS

| 1,507,217 | 9/24 | Sweet et al. | 74—476 |
| 1,820,006 | 8/31 | Beringer | 74—476 |
| 2,961,890 | 11/60 | Marshall | 74—473 X |
| 3,016,758 | 1/62 | Keller | 74—473 |

FOREIGN PATENTS 348,998   5/31   Great Britain.

BROUGHTON G. DURHAM, *Primary Examiner.*